June 2, 1970   J. R. WETCH   3,515,645
EVAPORATOR-CONDENSER UNIT FOR A DISTILLATION SYSTEM
Filed June 26, 1967
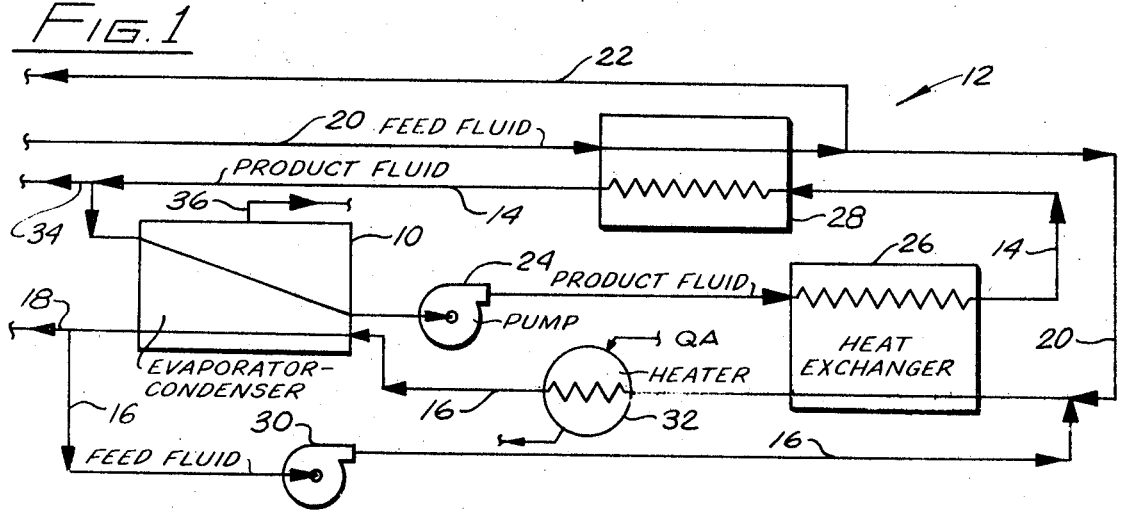
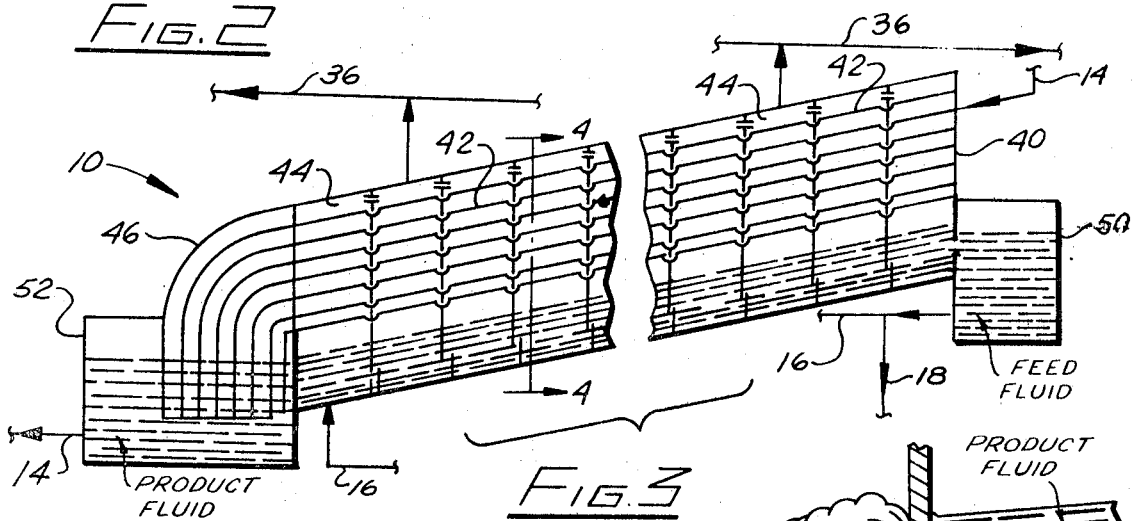
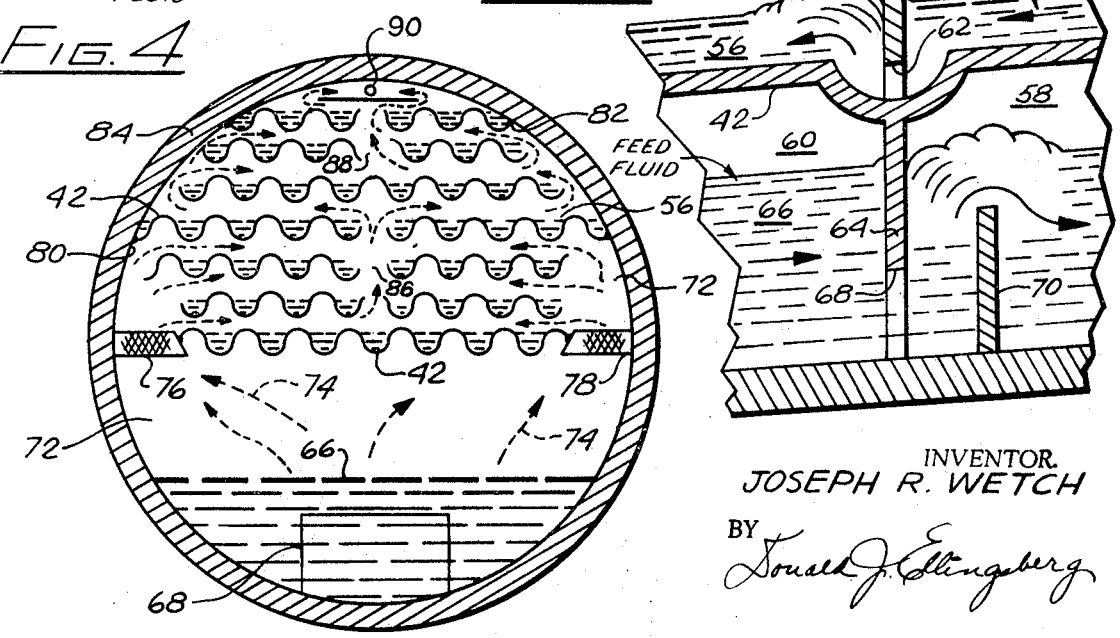
INVENTOR.
JOSEPH R. WETCH
BY
Donald J. Ellingsberg United States Patent Office 3,515,645
Patented June 2, 1970

3,515,645
EVAPORATOR-CONDENSER UNIT FOR A
DISTILLATION SYSTEM
Joseph R. Wetch, Sherman Oaks, Calif., assignor to North American Rockwell Corporation, a corporation of Delaware
Filed June 26, 1967, Ser. No. 648,582
Int. Cl. B01d 3/06; C02b 1/06
U.S. Cl. 202—173                                                  6 Claims

ABSTRACT OF THE DISCLOSURE

An evaporator-condenser unit for a distillation system which uses the vapor reheat process with direct condensation wherein the unit develops a flowing vapor that flashes from a flowing feed fluid and condenses in a flowing product fluid. The improved evaporator-condenser unit increases the rate of heat and mass transfer between the feed fluid and the product fluid which are interconnected by a common vapor space.

BACKGROUND OF THE INVENTION

The invention is directed to the known vapor reheat process using direct condensation. The basic principle of the vapor reheat process is the flash evaporation of a feed fluid, for example, raw sea water or brine, in a first chamber and the direct condensation of the resulting feed vapor in a product fluid, for example, potable or fresh water, in a second chamber where the first and second chambers are interconnected by a common vapor space.[1] In the vapor reheat process, equilibrium exists between the sea water and the fresh water when the vapor pressure of the sea water is the same as the vapor pressure of the fresh water. Equilibrium does not exist when the vapor pressure of the sea water is increased, for example, by heating the sea water. When the vapor pressure of the sea water is greater than that of the fresh water, water vapor transfers from the sea water chamber through the interconnecting vapor space to the fresh water chamber where it condenses in the water. Vapor transfer continues until equilibrium is established.

The vapor reheat process is one approach to the reduction in cost of multistage distillation systems. However, there is a need for increased system efficiency which can be realized by the new and improved evaporator-condenser unit of the invention that substantially increases the rate of heat and mass transfer between a feed fluid, e.g., sea water which contains undesirable amounts of contaminants, and a desirable product fluid, e.g. fresh water.

Accordingly, it is an object of the invention to provide a new and improved evaporator-condenser unit, particularly for a distillation system.

It is also an object to provide an evaporator-condenser unit having direct contact between flowing vapor and flowing product.

Another object of the invention is to provide an evaporator-condenser unit having increased product surface area.

Similarly, another object is to provide an evaporator-condenser unit having increased vapor condensation rates.

A further object is to provide an evaporator-condenser unit having relatively moderate flow velocities.

An additional object is to provide an evaporator-condenser unit that substantially eliminates feed contamination of product.

Yet another object is to provide an evaporator-condenser unit that is economical and has an increased operating life.

SUMMARY OF THE INVENTION

Briefly, in accordance with one form of the invention, an evaporator-condenser unit for a distillation system is provided having open product trays that direct a flowing product fluid such as fresh water through the unit and define a tortuous path for flowing vapor that flashes from a flowing feed fluid, such as raw sea water that passes through the unit, and condenses in the flowing product fluid.

Further objects, features, and the attending advantages of the invention will be apparent when the following description is read in connection with the accompanying drawing.

BRIEF DESCRIPTION OF THE DRAWING

FIG. 1 is a schematic block diagram of one form of distillation system using the vapor reheat process with direct condensation in which the new and improved evaporator-condenser unit of the invention finds use;

FIG. 2 is a schematic representation of one form of new and improved evaporator-condenser unit of the invention, partly broken away;

FIG. 3 is an enlarged portion, partly broken away, of the evaporator-condenser unit of FIG. 2; and FIG. 4 is a view of the evaporator-condenser unit of FIG. 2 along the line 4—4.

DESCRIPTION OF ONE EMBODIMENT

Referring to FIG. 1, one form of evaporator-condenser unit 10 of the invention can find use in a distillation system 12 that uses the vapor reheat process with direct condensation. A recirculating conduit 14 passes a recirculating product fluid such as fresh or potable water to the evaporator-condenser unit 10. The fresh water passes through the evaporator-condenser unit 10 in countercurrent flow to a feed fluid such as raw sea water that recycles in a recycle conduit 16 and also passes through the evaporator-condenser unit. The continuous blow-down of feed fluid through a blowdown conduit 18 and makeup sea water passing through an input conduit 20 to the recycle conduit 16 maintains the salinity of the raw sea water at a predetermined amount. Excess sea water returns through an excess conduit 22 to a sea water source (not shown). A product pump 24 pumps the recirculating fresh water in recirculating conduit 14 through a recuperator or heat exchanger 26.

A large percentage of the heat absorbed by the fresh water within the evaporator-condenser unit 10 as described hereinafter is given up to the recycling sea water passing through the recycle conduit 16 and the recuperator 26. Additional heat is recovered from the recirculating fresh water in an auxiliary cooler or heat exchanger 28 which warms the makeup sea water passing to the recycle conduit 16 through the input feed conduit 20. A feed pump 30 pumps the recycle sea water or brine in the recycle conduit through the recuperator 26 and through a feed heater 32. The feed heater 32 adds heat $Q_A$ to the recycle sea water so that the temperature of the sea water is increased. The fresh water enters the evaporator-condenser unit 10 from the recirculating conduit 14 at a low temperature and low pressure, flows through the evaporator-condenser unit by gravity, and passes from the unit at a high temperature and high pressure. The raw sea water enters the evaporator-condenser unit 10 from the recycle conduit 16 at a high temperature and high pressure, passes through the form of evaporator-condenser unit as shown by FIG. 1 in a countercurrent flow to the fresh water, and exits from the

[1] D. F. Othmer, R. F. Benenati, and G. C. Goulandris, "Vapor Reheat Flash Evaporation," Chemical Engineering Progress, vol. 57, No. 1 (January 1961).

unit at a low temperature and low pressure. As the sea water passes through the evaporator-condenser unit 10, water vapor flashes from the sea water and condenses in the fresh water as will be described. Fresh water drawn from the recirculating conduit 14 through a product conduit 34 caintains the level inventory of the recirculating fresh water at a controlled and predetermined level. A controlled vacuum is drawn upon the evaporator-condenser unit 10 through a vacuum conduit 36 which is connected to a suitable and conventional vacuum source (not shown).

Referring to FIG. 2, the evaporator-condenser unit 10 of FIG. 1 is shown with an exaggerated slope for purposes of illustration. The low temperature and low pressure recirculating fresh water enters the evaporator-condenser unit 10 from the recirculating conduit 14 at the upper or higher elevation end 40 of the unit and passes through a stacked arrangement of similar open product trays 42. The open product trays 42 direct the gravity-induced flow of fresh water through a series of stages 44 from the upper end 40 to the bottom or lower elevation end 46 of the evaporator-condenser unit 10. The high temperature and high pressure sea water enters the bottom end 46 of the evaporator-condenser unit 10 from the recycle conduit 16 and passes in the open channel defined by the unit to the upper end 40 of the unit as shown in a countercurrent flow to the recirculating fresh water. It is contemplated that the flows can also be co-current. The recycling sea water collects at the upper end 40 of the evaporator-condenser unit 10 in a sea water or brine receptacle 50 and passes to the recycling feed conduit 16. The recirculating fresh water collects at the bottom end 46 of the evaporator-condenser unit 10 in a product receptacle 52 and passes to the recirculating conduit 14.

Referring to FIGS. 2 and 3, the recirculating fresh water 56 passes through the evaporator-condenser unit 10 in similar open product trays such as open product tray 42. The fresh water 56 passes from stage 58 to stage 60, i.e., progressing from a stage in the unit 10 that has a higher elevation to the adjoining stage that has a lower elevation, through a suitable submerged orifice or port 62 in a barrier wall 64 that is spaced apart from similar barrier walls in the unit 10 to define the several stages, such as stages 58 and 60. The barrier wall 64 extends into and beneath the surface of the fresh water 56 in each of the stacked open product trays such as open product tray 42. The recycle sea water 66 flows in the open channel from stage 60 to stage 58, i.e., progressing from a stage in the unit 10 that has a lower elevation to the adjoining stage that has a higher elevation, through a suitable submerged orifice or port 68 in the barrier wall 64.

A baffle member or plate 70 on the side of barrier wall 64 nearest the upper end 40 of the unit 10 increases the surface turbulence of the flowing sea water 66 which increases the total surface area of the flowing sea water and thereby increases the total amount of water vapor that flashes from the sea water as described hereinafter. It is contemplated that a similar baffle plate can be used for selected product trays 42 on the side of the stage barrier wall nearest the bottom end 46 of the unit 10. It is also contemplated that baffle plate 70 can be omitted.

Since the evaporator-condenser unit 10 of my invention operates on the vapor reheat process using direct condensation, the temperature of the recycle sea water 66 is slightly greater than the temperature of the recirculating fresh water 56 in the same stage, such as stage 60. Also, the pressure in adjoining stages, such as stages 58 and 60, as shown by FIG. 3 is greater on the side of the common barrier wall, such as wall 64, that is physically nearest the lower end 46 of the evaporator-condenser unit 10 (see FIG. 2) and is lower on the side of the barrier wall that is nearest the upper end 40 of the unit. Therefore, the pressure in stage 60 (see FIG. 3) is greater than the pressure in stage 58. The pressure drop across barrier wall 64 is maintained by the submerged orifices, such as orifices 62 and 68, in the barrier wall. The submerged orifices permit the flowing fresh water 56 and sea water 66 to pass from stage-to-stage without affecting the pressure integrity of the adjoining stages in the evaporator-condenser unit 10. It is contemplated that several of the stages 44 at the upper end 40 of the evaporator-condenser unit 10 can slope downwardly towards the salt water chamber 50 instead of upwardly as shown by FIG. 2 so that gravity will assist the flow of sea water that is induced by the pressure drop set-up across adjoining stages.

Referring to FIG. 4, one stage of the plurality of similar stages 44 in the evaporator-condenser unit 10 of FIG. 2 is shown. In FIG. 4, the recycle sea water 66 passes into the plane of the drawing and the recirculating fresh water 56 passes out of the plane of the drawing. The recycle sea water 66 passes in the open channel defined by the unit 10 to the adjoining stage through the submerged orifice 68, which is shown in phantom, in the barrier wall that separates the adjoining stages (see FIG. 3 for similar structural details and related description). The recirculating fresh water 56 flows in the similar open product trays 42 which can be generally corrugated as shown.

It is contemplated that the product trays 42 can be other than corrugated as shown, for example, each can be a flat but open tray. It is also contemplated that other forms of product trays can be used. For example, stepped product trays descending in predetermined steps or levels toward the bottom end 46 of the unit 10 can be used. product trays descending in predetermined steps or levels also be used. The perforated trays would drip product fluid such as fresh water 56 from one product tray to the next lower product tray in a stack of product trays in each stage. The dripping product increases the total surface area that is exposed to the flowing water vapor as described hereinafter. It is also contemplated that baffles, fins, or the like can be placed in the flowing product to churn or roil the surface of the product and thereby increase the total surface area that is exposed to the flowing water vapor; this enhances direct condensation of the vapor in the flowing product.

When the temperature of the flowing sea water 66 is greater than the temperature of the flowing fresh water 56 in the same stage, water vapor flashes from the sea water into the common volume or vapor space 72 that interconnects the flowing sea water and flowing fresh water. This water vapor is schematically represented by dashed flow arrows 74 in FIG. 4. The flowing water vapor passes through conventional demisters or screens 76 and 78 and passes over the flowing fresh water 56 in the open product trays 42. Non-condensibles, e.g., air, are evacuated from vapor space 72 through a port 90 in the barrier wall or by the direct connection of a vacuum system (not shown) to a particular stage through a vacuum conduit, such as conduit 36 as shown schematically by FIGS. 1 and 2.

In the evaporator-condenser unit of my invention, the water vapor 74 passes from the flowing sea water 66 to the exhaust port 90 along a water vapor path that has a constantly decreasing vapor flow cross-sectional area. The constantly decreasing cross-sectional area ensures that the water vapor 74 has a substantially constant or adequate velocity at all points along the water vapor path so that the water vapor does not become stagnant at any point along the path. The product trays 42 are arranged in the evaporator-condenser unit 10 in a predetermined spaced-apart relationship as shown, for example, by FIG. 4. Selected edges of the product trays 42, such as tray edges 80 and 82, are connected to the chamber wall 84 of unit 10. The product trays 42 are further arranged or suitably formed to define openings, such as openings 86 and 88, that cooperate with the tray edges and define a water vapor path that has the desired constantly decreasing vapor flow cross-sectional area, and as shown by FIG.

4, is generally tortuous. The flowing water vapor 74 passes over the flowing fresh water 56 in the open product trays 42 and condenses in the fresh water. The noncondensibles are evacuated from the stage through vacuum port 90. The direct connection of the vacuum system to each stage in the evaporator-condenser unit 10 would eliminate the ports, such as port 90, in selected ones of the barrier walls as shown. While the vacuum system assists the flow of water vapor over the open product trays 42, the flow is generally developed by the temperature differential that is selectively established between the flowing sea water 66 and the flowing fresh water 56. Thus, the total volume removed from each stage of the evaporator-condenser unit 10 through the vacuum impressed upon each stage by the vacuum system is relatively small and does not adversely affect the pressure differentials that are established as has been described.

As an illustrative example, one form of evaporator-condenser unit 10 introduces the recirculating fresh water into the upper end 40 of the unit from the recirculating conduit 14 at a temperature of 67° Fahrenheit (F.), a pressure of 0.37 pound per square inch absolute (p.s.i.a.), and at a flow rate of about $4.34 \times 10^6$ pounds per hour (#/hr.). The recycle sea water or brine is introduced at the bottom end 46 of the unit 10 from the recycle conduit 16 at a temperature of 200° F., a pressure of 15 p.s.i.a., and a flow rate of about $5.28 \times 10^6$ #/hr. The recirculating water enters the product receptacle 52 at a temperature of 193.6° F., a pressure of 11.5 p.s.i.a., and at a flow rate of about $4.93 \times 10^6$ #/hr. The recycle sea water enters the sea water chamber 50 at a temperature of 73.3° F., a pressure of 0.37 p.s.i.a., and a flow rate of about $4.7 \times 10^6$ #/hr. Approximate elevations from a common datum line for the surface levels of each of the product and feed fluids at the bottom and upper ends of the unit are: bottom end—recycle sea water at 15 feet and recirculating fresh water at 19.77 feet; upper end—sea water at 42.70 feet and fresh water at 53.71 feet (surface level of upper open product tray). It is contemplated that suitable start-up pumps can be used to initiate the countercurrent flow of feed fluid through the several stages of the evaporator-condenser unit as may be required.

It can be seen from the foregoing description that the evaporator-condenser unit 10 of my invention provides flowing sea water and flowing fresh water with the direct condensation of flowing water vapor in the fresh water. Since the water vapor must follow a tortuous path defined by the product trays, the water vapor is not static or stagnant.

As will be evidenced from the foregoing description of one form of the invention, certain aspects of the invention are not limited to the particular details of construction as illustrated, and it is contemplated that other modifications and applications will occur to those who are skilled in the art. For example, additional open product trays can be positioned in the vapor space 72 (see FIG. 4) before the water vapor passes through the demisters 76 and 78 and over the illustrated product trays 42. It is, therefore, intended that the appended claims shall cover such modifications and applications that do not depart from the true spirit and scope of my invention.

I claim:
1. An evaporator-condenser unit for a distillation system to recover fresh water product as condensate from sea water comprising:
 (a) a chamber defining an evaporator and a condenser section having a longitudinal axis inclined to the horizontal and further having spaced-apart first and second ends,
 (b) a plurality of spaced-apart barrier walls positioned within said chamber defining a plurality of chamber stages between said first and second ends,
 (c) a plurality of longitudinally oriented vertically stacked open trays selectively spaced apart within each of said chamber stages having selected longitudinal tray edges connected to and spaced from said chamber, said open trays directing a flowing stream of said fresh water product through each of said chamber stages,
 (d) fresh water product orifices in each of said barrier walls connecting said stacked open trays in adjacent ones of said chamber stages in series flow communication, said fresh water product orifices being generally submerged under said flowing stream of said fresh water product,
 (e) a vertically disposed tortuous vapor path for water vapor generally defined in each of said chamber stages by said stacked open trays, said vapor path having lower spaced-apart entrance openings for water vapor an exit end in said condenser section with a constantly decreasing vapor flow cross-sectional area between said vapor path entrance and exit end,
 (f) a demister positioned in said vapor path adjacent said vapor path entrance openings,
 (g) said exit end comprising an exhaust port positioned in said vapor path at said vapor path exit end,
 (h) a channel for sea water defined by said chamber in each of said chamber stages and disposed below said stacked open trays adjacent said vapor path entrance end openings for directing a flowing sea water feed through each of said chamber stages,
 (i) sea water feed orifices in each of said barrier walls connecting said channels in adjacent ones of said chamber stages in series flow communication, said sea waters feed fluid orifices being generally submerged under said flowing feed,
 (j) said first chamber end being elevated above said second chamber end so that said fresh water product flowing through each of said chamber stages is gravity induced from said first chamber end to said second chamber end, said sea water feed flow being generally developed by an induced pressure differential between adjacent ones of said chamber stages,
 (k) a baffle means positioned adjacent each of said barrier walls on the barrier wall side nearest said first end and adjacent said sea water feed orifice in said barrier wall to increase surface turbulence of said sea water feed flowing through said sea water feed orifices, and
 (l) said flowing sea water feed being heated to a temperature greater than the temperature of said flowing fresh water product in each of said chamber stages so that water vapor flashes from said flowing sea water feed and flows over said open trays through the constantly decreasing cross-sectional area of said vapor path ensuring that the water vapor has a substantially constant velocity at all points along said vapor path and condenses directly in said flowing fresh water product.

2. The evaporator-condenser unit of claim 1 in which a vacuum source means is suitably connected to said chamber means to remove non-condensibles from said chamber volume.

3. The evaporator-condenser unit of claim 1 in which said fresh water product flows counter-current to said flowing sea water feed.

4. The evaporator-condenser unit of claim 1 in which a fresh water product receptacle means cooperates with said open tray means and collects said product, and a feed receptacle means cooperates with said open channel means and collects said sea water feed.

5. The evaporator-condenser unit of claim 1 in which said sea water feed flow is generally developed by an induced pressure differential between adjacent ones of said stages.

6. The evaporator-condenser unit of claim 1 in which said fresh water baffle means cooperates with selective ones of said submerged orifices to increase surface turbulence of the fresh water product fluid flowing through said orifices.

References Cited

UNITED STATES PATENTS

| | | | |
|---|---|---|---|
| 2,803,589 | 8/1957 | Thomas | 203—11 |
| 3,206,379 | 9/1965 | Hill | 203—100 X |
| 3,214,351 | 10/1965 | Lichtenstein et al. | 202—185 |
| 3,219,554 | 11/1965 | Woodward | 202—173 |
| 3,288,686 | 11/1966 | Othmer | 203—11 |
| 3,243,358 | 3/1966 | McCue | 202—173 |
| 3,249,517 | 5/1966 | Lockmann | 202—173 X |
| 3,284,318 | 11/1966 | Coanda et al. | 202—160 |
| 3,298,932 | 1/1967 | Bauer | 203—11 |
| 3,306,346 | 2/1967 | Othmer | 202—173 |
| 3,329,583 | 7/1967 | Othmer | 202—173 |
| 3,342,697 | 9/1967 | Hammond | 203—11 |
| 3,395,085 | 7/1968 | Kogan | 203—11 |

OTHER REFERENCES

Int. Symposium on Water Desalination 203–100 (d.c.) (Oct. 10, 1965) pages 1, 8 and 9.

NORMAN YUDKOFF, Primary Examiner

F. E. DRUMMOND, Assistant Examiner

U.S. Cl. X.R.

202—185, 197, 205; 203—11

PO-1050
(5/69)

UNITED STATES PATENT OFFICE
CERTIFICATE OF CORRECTION

Patent No. 3,515,645   Dated  June 2, 1970

Inventor(s)  J. R. Wetch

It is certified that error appears in the above-identified patent and that said Letters Patent are hereby corrected as shown below:

Column 3, line 6 after 34 "caintains" should read --maintains--.
Column 4, line 31 delete "product trays descending in predetermined steps or levels" and insert --Product trays that have perforated bottom surfaces can--.
Column 6, line 33 after "feed" delete "fluid".
Column 7, line 2 after "product" delete "fluid".

Signed and sealed this 12th day of February 1974.

(SEAL)
Attest:

EDWARD M. FLETCHER, JR.
Attesting Officer

C. MARSHALL DANN
Commissioner of Patents